United States Patent [19]

Polson

[11] 3,868,600
[45] Feb. 25, 1975

[54] ELECTRICAL ISOLATION DEVICE AND METHOD

[75] Inventor: Jerry H. Polson, Boulder, Colo.

[73] Assignee: Contel Corporation, Boulder, Colo.

[22] Filed: May 29, 1973

[21] Appl. No.: 364,454

[52] U.S. Cl. ............... 332/31 R, 331/74, 331/181, 332/12, 334/14
[51] Int. Cl. ......................... H03c 1/08, H03b 3/16
[58] Field of Search .................. 332/31 R, 31 T, 12; 331/74–77, 181; 334/12–14

[56] References Cited
UNITED STATES PATENTS
2,475,065   7/1949   Vogel.................................. 331/76

FOREIGN PATENTS OR APPLICATIONS
172,171   8/1952   Austria ............................... 331/74

Primary Examiner—Alfred L. Brody
Attorney, Agent, or Firm—Thomas W. O'Rourke

[57] ABSTRACT

A method and electrical device for transmitting information between isolated circuits through a transformer having windings tuned to resonate at a fixed frequency by exciting one of the windings of the transformer with an oscillating signal, of about the fixed frequency, and varying the amplitude of the oscillating signal by changing the electrical characteristics or loads associated with the transformer winding or windings not excited by the oscillating signal, the variation or modulation of the oscillating signal being opposite in sense than that conventionally expected from mutual inductance between windings of a transformer and advantageous for the transmission of digital or analogue information.

12 Claims, 4 Drawing Figures

ELECTRICAL ISOLATION DEVICE AND METHOD

BACKGROUND OF THE INVENTION

1. Field of the Invention

The present invention relates generally to transmission of information between isolated circuits, and more particularly to transfer of information between isolated circuits by means of modulating the amplitude of an oscillating signal applied to one winding of a transformer, all windings of which are tuned to resonate at about the frequency of the oscillating signal, by varying the electrical characteristics of the circuit associated with another isolated winding of the transformer.

2. Description of the Prior Art

Many applications of electronics present a problem of transmitting information from various sections of devices in which the sections of the devices are maintained at substantial different electromotive force. Put simply, it is not uncommon to have one section of an electrical device operating at very high AC or DC voltages with the need to interface such high voltage section with a separate low voltage section which, for instance, may be in contact with individuals requiring protection from the high voltage section. The problem exists in transferrign information from the high voltage section to the low voltage section while maintaining, for purposes of the voltages, electrical isolation between the sections.

A number of solutions to this problem have been proposed. In most part, the solutions have involved encoding the information to be transmitted and, by means of modulation of such means as light waves, lasers, radio waves, etc., transmitting the information between the sections by means of telementry. It will be readily recognized that such encoding and telemetry involve substantial complications symptomatic of which is the need for a power supply and comprehensive circuits in both sections of the link, i.e., in the high voltage section and in the low voltage section. Summarily, many of the isolation circuits and couplers currently utilized depend heavily upon physical isolation of the circuits with electromagnetic transmission—as opposed to true coupling—in the light and radio frequency ranges.

From an entirely differnt viewpoint, it is known that coupling through mutual inductance exists between the windings of a transformer. For instance, in a simple power transformer, a single applied to the primary power transformer is reproduced at the output windings of the transformer is reproduced at the output of this secondary winding of the transformer with appropriate changes in the voltage-current relationship. In a crude sense, this is a transfer of information. However, it is generally recognized that a decrease in the inpedance of the load associated with the secondary windings will decrease the effective impedance of the primary circuit. Such decrease in impedance will, in the case of a constant current source of an oscillating signal, diminish the amplitude of such a signal. A diminished signal is not ideal for, as an example, driving many solid-state components to reproduce the condition imposed upon the secondary circuit.

SUMMARY OF THE INVENTION

The present invention, which provides a heretofore unavailable improvement over previous isolation coupling in circuits, comprises a method and device wherein an oscillating signal is provided to the primary winding or windings of the transformer which includes electrical isolation between the primary winding or windings and secondary winding or windings. Further, and critical to the operation of the invention, all of the windings of the transformer are tuned to resonate at a frequency at or near the frequency of the oscillating signal.

Most surprisingly, it has been discovered that the variation or modulation of the amplitude of the oscillating signal is quite different when the transforming windings are so tuned for resonance. Lowering of the impedance of the circuitry incorporating the secondary windings of such transformer, as by such as the closing of a switch therein, increases the signal strength of the oscillating signal applied to the primary windings of such a tuned transformer. Rather than reduced signal strength expected from a reduction in impedance by means of referred impedance through conventional mutual inductions, the tuned circuits of the present invention produce an increase in signal strength in response to a lower impedance in the secondary windings circuit. The increase in signal strength is of a very substantial magnitude, i.e., 50 percent or greater. It will, of course, be recognized that accurate and rapid transfer of an "on-off" signal, in combination of the appropriate and well-known encoding and decoding devices, permits transmission of much more complicated information in digital form. Alternatively, if desired, transmission of an analogue signal such as low frequency analogue or audio information may also be transmitted through the isolation coupling of the instant invention.

Accordingly, an object of the present invention is to provide a new and improved coupling of isolated circuits by means of a simple, compact electrical device.

Another object of the present invention is to provide a means of coupling isolated circuits wherein one side of the link is operable with only a passive component array.

Yet another object of the present invention is to provide for linking of circuits through a dielectric insulator by means of a particularly tuned transformer.

Still another object of the present invention is to provide for the operation of a transformer by which moudlation of a signal associated with one winding of a transformer by variations in the electrical characteristics of the other winding of the transformer is accomplished in a manner opposite of and more advantageous than that conventionally resulting from linking circuits through a transformer.

Yet still another object of the present invention is to provide an electrical device wherein a transformer having isolated windings tuned to resonate at a fixed frequency is excited by a constant current, oscillating signal whereby an increase in the signal strength is accomplished by descreasing the impedance of circuits associated with the winding isolated from the circuit receiving the signal.

These and other objects and features of the present invention will become apparent from the following description.

DETAILED DESCRIPTION OF THE DRAWINGS

Figure 1:
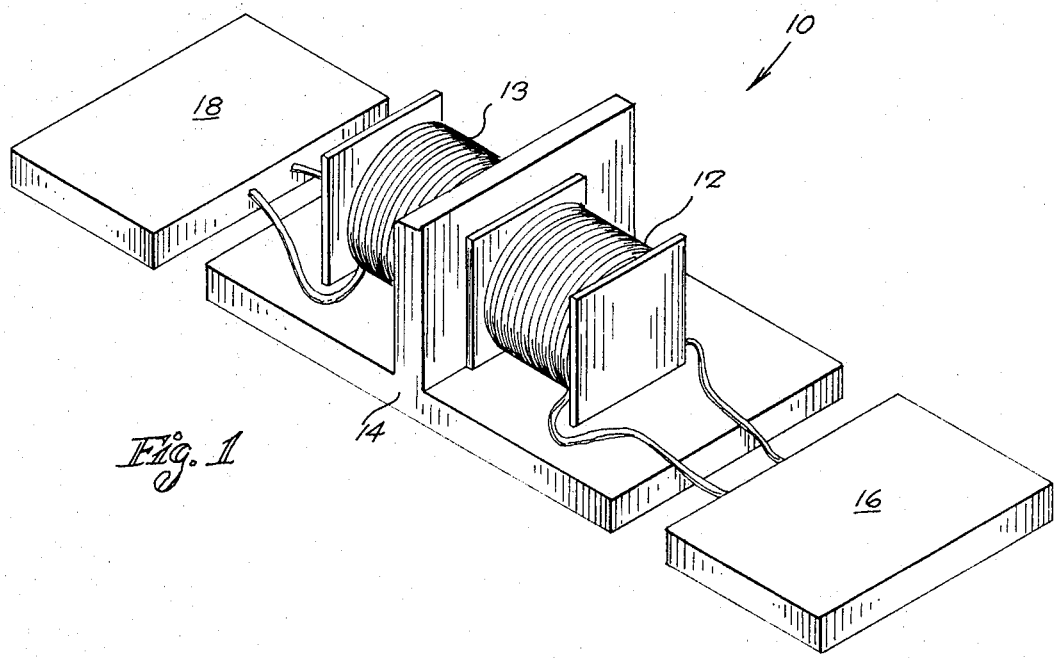
FIG. 1 is a partial schematic diagram and partial perspective view of an isolated circuiit utilizing the transformer in accordance with the instant invention.

Turning now to the drawings, wherein like components are designated by like reference numerals throughout the various figures, the device for transmitting information between isolated circuits is illustrated in FIG. 1 and generally designated by the reference numeral 10. As will be described in more detail hereinafter, device 10 utilizes at least two windings, a primary and secondary winding isolated from one another and tuned to resonate at a fixed frequency. An oscillating signal at or near the fixed frequency is applied to the primary winding. Variations in the signal strength of the oscillating signal opposite from those conventionally expected are accomplished by varying the electrical characteristics of the circuits incorporating the secondary windings of the transformer.

As illustrated in FIG. 1, isolation transformer 10 includes primary windings 12 and secondary windings 13 supported on and separated physically by a dielectric material 14. Primary coil 12 is electrically conneted to a circuit 16 which provides both for the tuning of primary winding 12 to resonate at a fixed frequency and also for the application of an oscillating signal at or near the fixed frequency to be applied to primary winding 12.

Circuit 18 is electrically connected to secondary winding 13 and provides for tuning of the secondary winding 13 to resonate at or near the fixed frequency and, as will be shown in more detail below, for a simple, compact and, optionally, power-source free array, changes the electrical characteristics of the secondary winding 13, as a result of information supplied to circuit 18. In the case of a constant current, oscillating signal applied to primary winding 12 by circuit 16, the signal strength of the oscillating signal varies inversely as the impedance of the circuit 18 associated with secondary winding 13.

Figure 2:
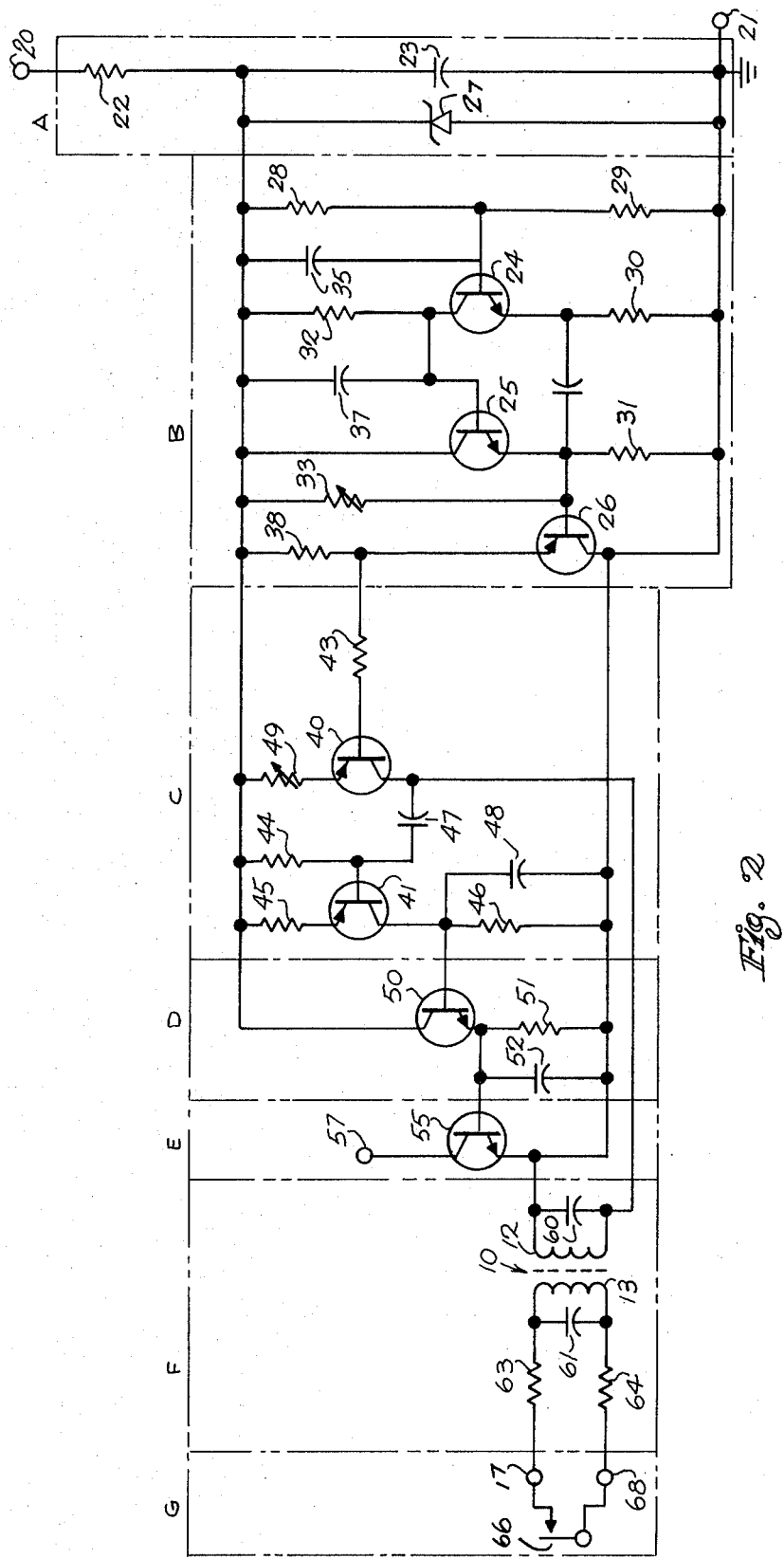
FIG. 2 is a schematic diagram of an electrical circuit utilizable with the device of FIG. 1.

A more complete illustration of the invention is shown in FIG. 2 wherein the circuit 16 comprises Section A, a conventional DC voltage regulator section, Section B, a variable frequency, a stable multivibrator and emitter follower, Section C, an amplifier section, Section D, a detector section, and Section E, an output driver section. Section F comprises the isolated coupling transformer 10 and Section G comprises the information input circuit 18.

Conventional DC voltages regulator Section A includes inputs 20 and 21 for application unregulated DC voltage. Resistor 22, capacitor 23 and zener diode 27, in a conventional manner, regulates the voltage to supply a constant voltage source of proper current to the other sections of the circuitry.

Section B comprises transistor 24 and trnasistor 25, in conjunction with resistor 28, resistor 29, resistor 30, resistor 31 and resistor 32 which, in conjunction with variable resistor 33 and capacitor 35, capacitor 36 and capacitor 37, form a basic and conventional miltivibrator circuit which, by adjustment of variable resistor 33, may be regulated to a desired frequency of osicllation by changing the time constant. Capacitors 35 and 37 serve as small bypass capacitors to reduce stray radio frequency energy interference effects upon the frequency of the multivibrator. Only a minor, fixed effect on the multivibrator frequency results from such use of capacitor 35 and capacitor 37. Transistor 26 and resistor 32 form an emitter follower circuit which provides for isolation of varying load effects of the rest of the circuits to preclude such effects from affecting the multivibrator frequency or signal amplitude.

The multivibrator output is applied to amplifier Section C which includes transistors 40 and 41 and associated components resistor 43, resistor 44, resistor 45, resistor 46, capacitors 47 and 48. Transistor 40 and its associated components constitue a common emitter-type tuned collector amplifier with an unbypassed variable emitter resistance 49 which is used to adjust the gain of this amplifier stage.

Thus, the input signal for Section C is provided by the multivibrator circuit Section B and is applied through resistor 43. Variable resistor 49 is utilized to obtain the proper signal level at the output of transistor 40. The output stage of transistor 40 includes the tuned circuit comprised of capacitor 60 and primary winding 12 of Section F.

The output of the amplifier stage indcluding transistor 40 is applied through capacitor 47 to the Class C amplifier stage containing transistor 41. Since both the base and emitter of transistor 41 are held at the level of the supply voltage by resistors 44 and 45, respectively, transistor 41 remains off until a signal level of peak amplitude greater than a given threshold is applied to the base. Any signal level exceeding such threshold voltage peak will be amplified by transistor 41 and exist at the output across resistor 46. Capacitor 48, a small bypass capacitor, is included for the purpose of filtering radio frequency interference. The output of the transistor 40 amplifier stage is a sine wave at the multivibrator frequency and, accordingly, transistor 41 stage output consists of rectified sine wave peaks.

The rectified sine wave peaks from transistor 41 amplifier stage drive detector Section D consisting of transistor 50, resistor 51 and capacitor 52. Transistor 50 turns on during the peaks of the signal applied to it from transistor 41. When transistor 50 turns on, it charges capacitor 52 to the level of the peak voltage of the input signal. When transistor 50 is turned off, i.e., between signal peaks, capacitor 52 holds the peak voltage value. Resistor 51 provides for a proper decay time for discharging capacitor 52 when transistor 50 input signal is removed. The detected DC voltage across capacitor 52 of detector Section D is used to drive the output Section E consisting of transistor 55. Transistor 55 functions as a switch which, when activated, shorts the output 57 to circuit ground. The manner in which this desired final result is obtained will be appreciated with reference to tuned isolation/coupling Section F and switch Section G.

The sine wave signal existing across primary winding 12 of tuned transformer 10 is coupled to secondary winding 13 through a dielectric voltage isolation barrier 14 as shown in FIG. 1. Primary winding 12 is tuned in conjunction with capacitor 60 and secondary winding 13 is tuned with capacitor 61 to resonate at the frequency at the sine wave signal applied to the primary winding through the collector circuit of amplifier stage including transistor 40.

Resistors 63 and 64, in conjunction with condenser 61, function as a radio frequency filter to preclude interference from switch Section G. Section G quite simply is comprised of a switch 66 positioned across terminals 67 and 68 of isolation Section F. Switch 66 may be any means of completing and breaking a circuit including a trnasistor, optical means or further circuits.

In operation, the gain of amplifier stage transistor 40 is set by variable resistor 49 to such a level that the signal level across primary winding 12 is just below that required to turn on the Class C amplifier stage including transistor 41. This adjustment and tuning is accomplished with switch 66 open.

Since, according to the present invention, primary winding 12 and capacitor 60 and secondary windings 13 and capacitor 61 are turned to resonate at the signal frequency applied from the collector of transistor 40, the closing of switch 66 alters the load upon the secondary winding 13. Accordingly, the signal at primary winding 12 and, hence, on the collector of transistor 40, will increase in level by an amount of approximately 50 percent. This increase in signal level is dependent upon how closely primary winding 12 and secondary winding 13, and accompanying tuning circuits, are tuned to the operating frequency from the collector of transistor 40, the Q of the tuned circuits, and the values of resistor 63 are resistor 64. The greater the circuit's Q and the lower the values of resistors 63 and 64, the greater the increase in signal level tends to be.

The signal level increase at primary winding 12 when switch 66 is closed is due to a unique and unobvious characteristic of transformer 10 having windings 12 and 13 in resonance when load conditions are varied when driven by a constant current source, i.e., the amplifier stage including transistor 40. Tuned primary winding 12 and tuned secondary winding 13 serve to attenuate the strength of the oscillating signal. When the load is varied as by descreasing the impedance of the secondary winding 13, the strength of the oscillating signal increases rather than decreasing in the conventional and expected manner. A similar relationship exists when the impedance is increased.

As described above, when switch 66 is open, the signal level at the collector of transistor 40 is less than that required to turn on the stage including transistor 41. However, when switch 66 is closed, the signal from the collector of transistor 40 increases thereby turning on the amplifier stage including transistor 41. This in turn supplies appropriate signal to transistor 50 in the detector stage D. The output through capacitor 52 of detector stage D then drives transistor 55, the output, providing a current sink path from output 57 to ground. Transistor 55, therefore, forms an output transistor switch.

Summarily, the closing of switch 66 results in a similar switch action at transistor 55. However, the circuit including switch 66 is dielectrically isolated from the circuit including transistor 55 by means of isolation transistor 10. Shown in FIG. 1, the isolation is provided by dielectric isolation material 14 positioned between primary circuit 12 and secondary winding 13 of isolation transformer 10.

Depending, of course, on the construction details, the isolation provided by transformer 10 can be effective for tens of thousands of volts of DC or low frequency AC, and for thousands of volts of radio frequency energy.

Figure 3:
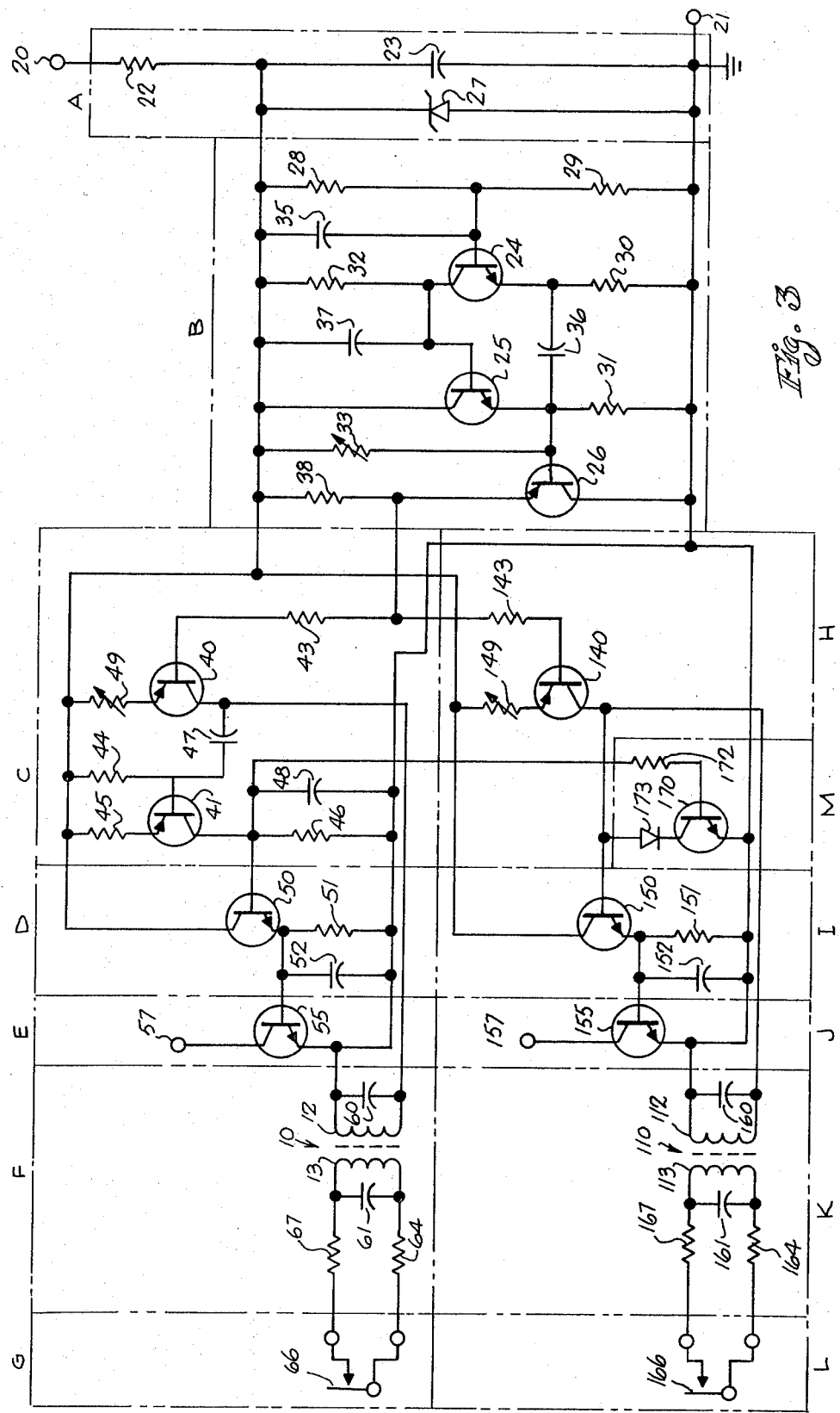
FIG. 3 is a schematic diagram of a more complicated electrical circuit illustrating multiple use of the device of FIG. 1.

Another circuit illustrating the versatility of the instant invention is shown in FIG. 3. As will be noted, Sections A, B, C, D, E, F and G of the circuit illustrated in FIG. 3 and constituting a first channel are identical to the circuit shown in FIG. 2. However, the output from the miltivibrator Section B is also supplied to a second channel including amplifier Section H which is, in essence, identical to amplifier Section C. Accordingly, transistor 140, resistor 143 and variable resistor 149 correspond to transistor 40, resistor 43 and variable resistor 49. However, the Class C stage amplifier including transistor 41 of Section C of the first channel is omitted in the second channel. Section I, corresponding to Section D, output Section J, corresponding the Section E, isolation Section K, corresponding to Section F, and switch Section L, corresponding to Section G are equivalent sections in each of the channels.

The second channel shown in FIG. 3 is useful for situations in which a larger signal is to be imposed upon switch 166 than can be tolerated across switch 66 of the first channel. In this instance, a higher signal level is supplied to isolation transformer 110 by adjusting variable resistor 149 of the amplification stage including transistor 140. When the signal level is adjusted just below the thresh-old of the turn-on point of output transistor 155, detector transistor 150 will be maintained in a turn-on condition. Thus, when switch 166 is closed, the signal level increases sufficiently for transistor 155 to be activated in a like manner to that of transistor 55 thereby completing the circuit between terminal 157 and ground. Thus, for the most part, the operation of the second channel is analogous to that of the first channel.

An additional over-ride Section M is provided in the second channel. This includes transistor 170, resistor 172 and diode 173. Over-ride Section M is incorporated to prevent output terminal 157 from being activated when switch 66 of the first channel is closed even if switch 166 of the second channel is closed. This is accomplished by transistor 170 turning on through resistor 172 whenever the signal from transistor 41 is present. When transistor 170 turns on, it shorts the signal of the collector of transistor 140 through primary winding 112 and through diode 173, thereby shorting to ground. Accordingly, the closing of switch 166 is immaterial when switch 66 is closed since no signal is available to turn the transistor 155. When switch 66 is open, the closing of switch 166 produces a result, i.e., the turning on of transistor 155 and the shorting to ground of post 157 in a manner described in detail concerning FIG. 2 and, in essence, the first channel described in FIG. 3.

Figure 4:
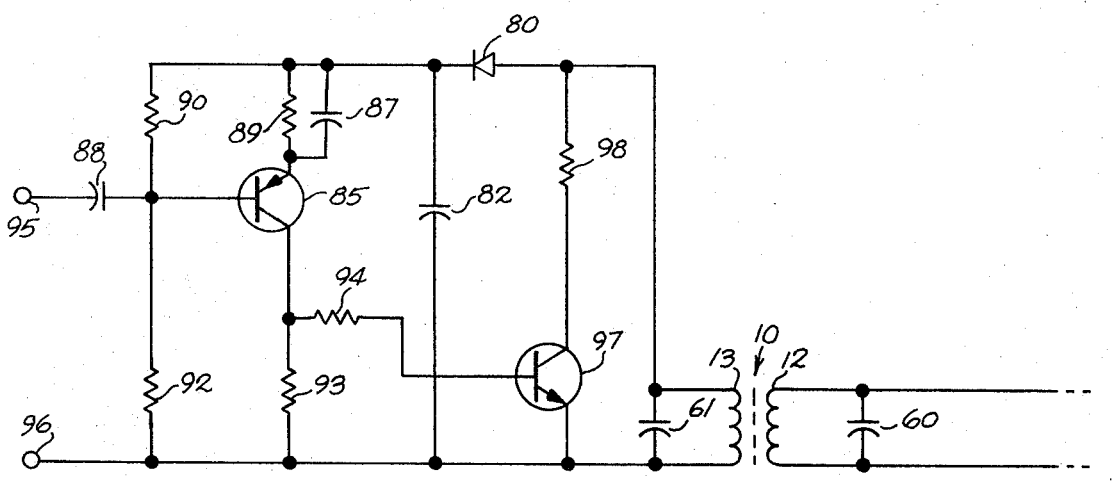
FIG. 4 is a schematic diagram of an electrical circuit utilizable with the device of FIG. 1 to transmit analogue information.

The embodiments of FIGS. 2 and 3 have been described in some detail to illustrate the various operation conditions under which the present invention is operable. For purposes of illustration, switches 66 and 166 have been included as a simple means of transmitting on-off information, with the applicability of such information to the transmittal of digital information being apparent. However, if analogue information is to be transmitted, a circuit as shown in FIG. 4 can be substituted for switch Section G and L of FIGS. 2 and 3. The illustrated circuity is suitable, for instance, for the transmission of low frequency analogue or audio information while, of course, maintaining the isolation between the input circuit and the other second sections of the circuit.

Again, isolation transformer 10 with tuned primary winding 12 and tuned secondary winding 13 is provided. Capacitors 60 and 61 are included to provide the proper tuning of primary winding 12 and secondary winding 13, resepctively. Energy existing at secondary winding 13 of transformer 10 is rectified and filtered by diode 80 and capacitor 82. Thus, a low power cource from secondary winding 13 is provided to a signal amplifier including transistor 85, capacitors 87 and 88, and resistors 89, 90, 92, 93 and 94.

The amplifier stage including transistor 85 receives an analogue signal across input terminals 95 and 96. The output from the amplifier including transistor 85 drives transistor 97, the output of which is at a level controlled by resistor 98, to provide a variable load across secondary winding 13 of isolation transformer 10. Variations in the load across secondary winding 13 are translated to a change in signal amplitude on the primary winding 12 side of transformer 10. The modulation of the signal as a result of the change in the load across secondary winding 13 occurs as described above particularly with regard to the description of FIG. 1. Output corresponding to the input across terminals 95 and 97 would be taken directly from detector Section D at transistor 50 of FIG. 2. Section E, and accompanying transistor 55, capacitor 52 and resistor 51, would not be utilized in the event an input such as shown in FIG. 4 is utilized.

From the above-detailed description, it is apparent that the particular isolation transformer utilizing a dielectric material to physically isolate the primary and secondary windings, and in which the primary and secondary windings are both tuned to resonate at a given frequency, provides responses and advantages heretofore unknown. While the transformer illustrated in FIG. 1 shows the windings on a common axis in an adjacent but separated relationship, it is to be understood that the windings could be disposed of parallel axes, concentrically on a common axis or in any other configuration provided that the windings are sufficiently close to influence each other and also isolated by means of a dielectric material. If particularly high voltages are not utilized, it is to be understood that air constitutes a dielectric material. Liquid, gaseous or solid dielectrics are contemplated.

Though several specific embodiments of the present invention have been illustrated and described, it is anticipated that various changed and modifications will be apparent to those skilled in the art and that such changes may be made without departing from the scope of the invention, as defined by the following claims.

What is claimed is:

1. A method of transmitting information between isolated circuits, comprising: generating a constant current oscillating signal, tuning both the primary winding circuit and secondary winding circuit of an isolation transformer to resonate at about the frequency of the oscillating signal, applying the oscillating signal to the primary winding of the isolation transformer, concurrently applying the oscillating signal to an amplifier through a direct connection thereto, varying the electrical characteristics of the circuit associated with the secondary winding of the transformer by providing an information signal thereto to vary the impedance of the circuit connected to the secondary winding, varying the strength of the oscillating signal inversely to the variation of the impedance connected to the secondary winding while maintaining the resonate condition of the transformer, and driving the amplifier in response to variation of the strength of the oscillating signal to provide an amplifier output on the primary side of the isolation transformer corresponding to the isolated information signal applied to the secondary winding side circuit of the isolation transformer.

2. A method for coupling isolated circuits magnetically, comprising: applying an oscillating signal to the primary winding of a transformer having the primary windings and the secondary windings effectively separated by a dielectric barrier, tuning both the primary windings and secondary windings to resonate at the frequency of the oscillating signal, and varying the strength of the oscillating signal in a manner inverse to that normally resulting from magnetic coupling by varying in accordance with an information signal the electrical characteristics of the circuit connected to the secondary winding of the transformer while maintaining the resonant condition, detecting information at the circuit connected to the primary winding as a function of the variation of the oscillating signal strength corresponding to the information signal applied to the isolated circuit connected to the secondary winding.

3. A method as set forth in claim 2, wherein the oscillating signal is a constant current signal and the amplitude of the signal varies inversely of the variation of the impedance associated with the secondary winding.

4. A method as set forth in claim 2, wherein a switch means incorporated in the circuit of the secondary winding is opened and closed, and, in response to the closing of the switch means to diminish the impedance of the circuit connected to the secondary winding, the strength of the oscillataing signal is increased, detected and utilized to complete a contact in the circuit of the primary winding.

5. A method as set forth in claim 2, wherein the impedance associated with the circuit connected to the secondary winding is varied in response to an analogue input to the secondary winding circuit and the strength of the oscillating signal is varied and detected in a corresponding analogue manner in the circuit connected to the primary circuit.

6. A method as set forth in claim 5, wherein the variations in strength of the detected oscillating signal are amplified and detected to produce an output from the primary winding circuit corresponding to the input to the secondary circuit input.

7. A method as set forth in claim 5, wherein the secondary circuit analogue input is amplified and the amplifier is powered by the oscillating signal through the isolation transformer.

8. A method of operation an isolation transformer having dielectrically separated primary and secondary windings, comprising: supplying an oscillating signal to the primary winding of the transformer, tuning the primary and secondary windings to resonate at about the frequency of the oscillating signal, selectively and inversely varying the strength of the oscillating signal by varying the impedance connected to the secondary winding while maintaining the resonate relationship between the tuning of the primary and secondary windings and frequency of the oscillating signal, and detecting the variations in strength of the oscillating signal.

9. An electrical device for transmitting information between isolated circuits, comprising: an isolation transformer having at least one primary winding and at least one secondary winding positioned in a spaced-apart but adjacent relationship with a dielectric barrier therebetween, means for generating an oscillating signal of a fixed frequency, means for tuning the primary and secondary windings of the isolation transformer to resonate at about the fixed frequecny, information input means to vary the impedance of the circuit connected to the secondary winding while maintaining the resonant condition, and means on the primary side of the transformer to detect variations is strength of the oscillating signal in inverse response to variations in impedance of the circuit connected to the secondary winding in accord with the information input signal.

10. An electrical device as set forth in claim 9, wherein the means for generating an oscillating signal also provides a constant current signal.

11. An electrical device for transmitting information between isolated circuits, comprising: an astable multivibrator section providing a signal of fixed frequency, an amplifier section providing a constant current signal of a fixed frequency, an isolation transformer having the circuit connected to the primary winding thereof tuned to resonate at about the fixed frequency and the circuit connected to the secondary winding thereof also tuned to resonate at about the fixed frequency, the isolation transformer being connected to the amplifier section to receive the signal therefrom at the primary winding, a detector section also receiving the signal from the amplifier, and information signal input means for varying the impedance of the circuit connected to the secondary winding in accord with an information signal input thereto while maintaining the resonant condition, whereby the oscillating signal is varied in strength as the secondary winding circuit impedance is modulated and the varied oscillating signal drives the detector stage in response to the isolated information signal.

12. An electrical device as set forth in claim 11, wherein the information input means comprises a power supply energized by the oscillating signal through the isolation transformer and an amplifier receiving the information signal and powered by the power supply.

* * * * *

UNITED STATES PATENT OFFICE
CERTIFICATE OF CORRECTION

Patent No. 3,868,600                    Dated February 25, 1975

Inventor(s) Jerry H. Polson

It is certified that error appears in the above-identified patent and that said Letters Patent are hereby corrected as shown below:

Column 1, line 25, correct "transferrign", to read --transferring--;

Column 1, line 34, correct "telementry", to read --telemetry--;

Column 1, line 44, correct "differnt", to read --different--;

Column 1, line 65, correct "in", to read --of--;

Column 1, line 67, correct "the", to read --a--;

Column 2, line 42, correct "moud-", to read --modu- --;

Column 2, line 64, correct "circuiit", to read --circuit--;

Column 3, line 27, correct "conneted", to read --connected--;

Column 3, line 54, correct "voltages", to read --voltage--;

Column 3, line 66, correct "osicllation", to read --oscillation--;

Column 4, line 14, correct "constitue", to read --constitute--;

Column 4, line 25, correct "indcluding", to read --including--;

Column 5, line 6, correct "of", to read --for--;

UNITED STATES PATENT OFFICE
CERTIFICATE OF CORRECTION

Patent No. 3,868,600    Dated February 25, 1975

Inventor(s) Jerry H. Polson

It is certified that error appears in the above-identified patent and that said Letters Patent are hereby corrected as shown below:

Column 5, line 7, correct "trnasistor", to read --transistor--;

Column 5, line 15, correct "windings", to read --winding--;

Column 5, line 38, correct "descreasing", to read --decreasing--;

Column 5, line 59, correct "transistor", to read --transformer--;

Column 6, line 47, after the words "to turn" add --on--;

Column 7, line 5, correct "resepctively", to read -- respectively --;

Column 7, line 7, correct "cource", to read --source--;

Column 7, line 38, correct "of", to read --on--;

Column 7, line 48, correct "changed", to read --changes--;

Column 8, line 35, correct "oscillataing", to read -- oscillating --;

Column 8, line 54, correct "operation", to read --operating--;

Column 9, line 7, correct "frequecny", to read --frequency--;

Column 9, line 22, correct "a", to read --the--.

Signed and sealed this 20th day of May 1975.

(SEAL)
Attest:

RUTH C. MASON
Attesting Officer

C. MARSHALL DANN
Commissioner of Patents
and Trademarks